March 4, 1952 — I. J. RIGA ET AL — 2,588,047
HIGH-SPEED DRIVE FOR BICYCLES
Filed Sept. 9, 1949 — 2 SHEETS—SHEET 1
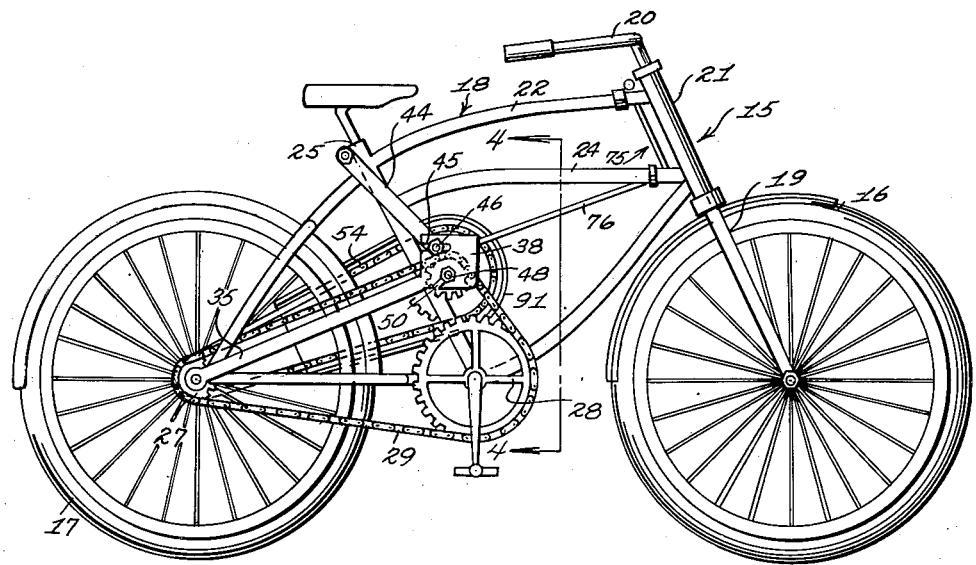
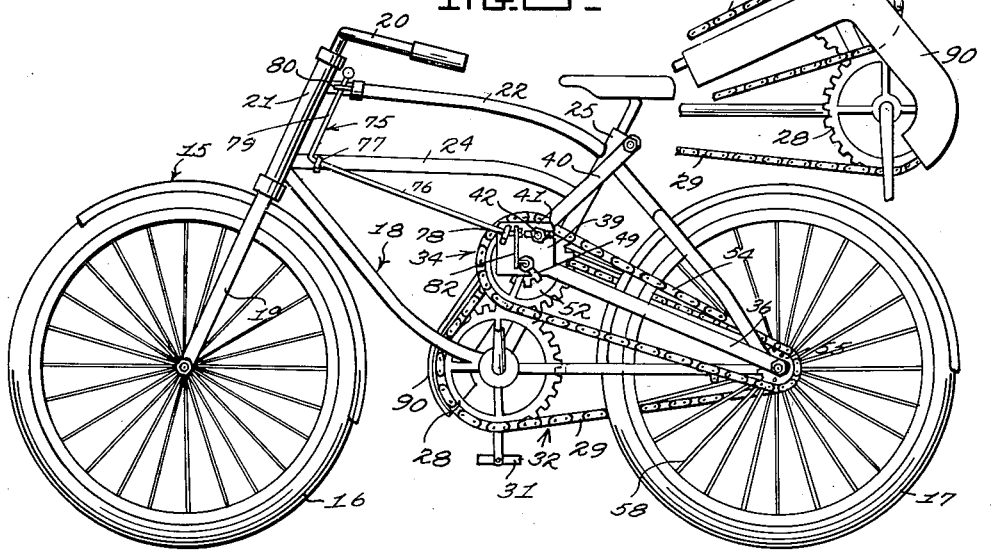
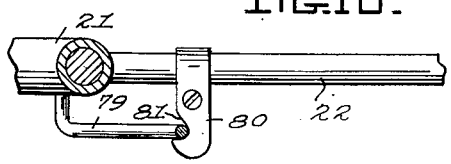
INVENTORS
JAMES P. RIGA
BY IVO J. RIGA
McMorrow, Berman + Davidson
ATTORNEYS

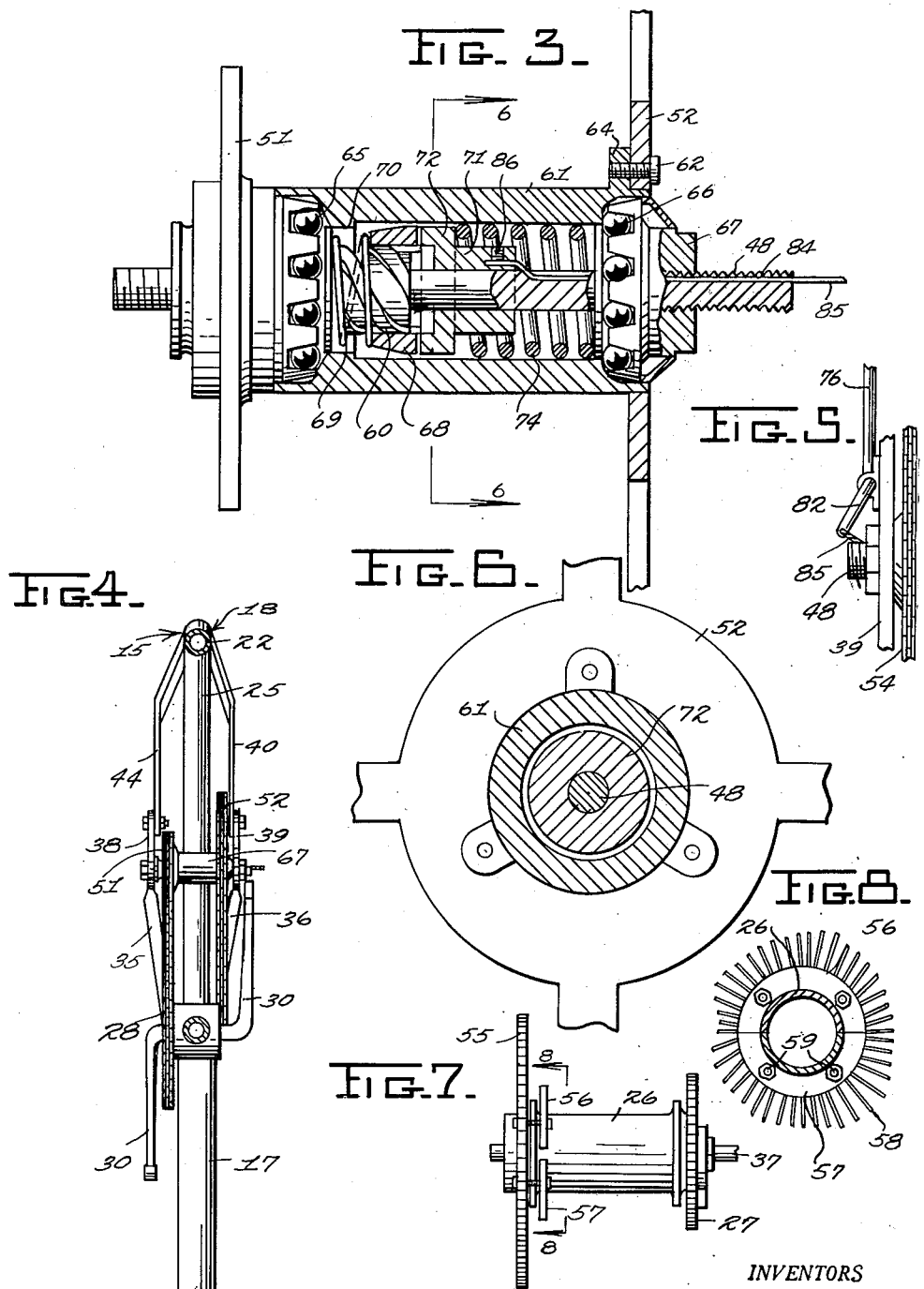

Patented Mar. 4, 1952

2,588,047

UNITED STATES PATENT OFFICE 2,588,047

HIGH-SPEED DRIVE FOR BICYCLES

Ivo J. Riga and James P. Riga, Jonesboro, Ark.

Application September 9, 1949, Serial No. 114,802

2 Claims. (Cl. 280—238)

This invention relates to driving means for bicycles, and the like, and more particularly to a high-speed gearing selectively engageable with the conventional driving sprockets of a bicycle.

It is an object of this invention to provide a second driving gear and sprocket on a bicycle having a higher gear ratio than the conventional driving gear and chain drive and a clutch for selectively engaging the conventional or added high-speed drive for the rear or driving wheel.

Another object of this invention is to provide a high-speed drive for a bicycle operatively connectible with a conventional drive having a manually-controlled clutch for selectively engaging or disengaging the high-speed drive with the conventional drive, the clutch being formed for disengagement when the rear or driving wheel rotates at a speed greater than the high-speed drive.

Still another object of this invention is to provide a high-speed drive for attachment on a bicycle engaging the conventional drive to be actuated by the same pedal-actuated gear, the conventional drive including a coaster brake carried by the hub of the wheel and a clutch connection between the conventional drive and high-speed comprising the same type of coaster brake or clutch, whereby the pedals may remain at rest while coasting in both the conventional and high-speed drive.

With the above and other objects in view, my invention consists in the arrangement, combination and details of construction disclosed in the drawings and specification, and then more particularly pointed out in the appended claims.

In the drawings:

Figure 1 is a right side elevation of a bicycle having a high-speed drive constructed according to an embodiment of our invention;

Figure 2 is a side elevation of the left side of bicycle;

Figure 3 is a transverse section of the clutch assembly between the high-speed drive and the conventional drive;

Figure 4 is a transverse section taken on the line 4—4 of Figure 1;

Figure 5 is a rear elevation, partly broken away, of the engagement of the clutch lever with the speed-changing clutch;

Figure 6 is a transverse section taken on the line 6—6 of Figure 3;

Figure 7 is a fragmentary rear elevation of the rear wheel hub including the conventional and high-speed sprockets;

Figure 8 is a transverse section taken on the line 8—8 of Figure 7;

Figure 9 is a fragmentary side elevation of the right side of the bicycle, showing the sprocket and chain cover;

Figure 10 is a fragmentary longitudinal section showing the engagement of the clutch lever with the clutch-lever-retaining latch.

Referring to the drawings, the numeral 15 designates generally a conventional style of bicycle having a front wheel 16 and a rear wheel 17 mounted on a conventional style of frame 18. The frame 18 includes a fork 19 rotatably mounted on the forward end operatively connected with the steering handle 20. The connection between the handle 20 and the fork 19 is rotatably mounted in a sleeve 21 carried by the forward end of the frame 18. A longitudinally extending frame member 22 which has its forward end fixed to the sleeve 21 and carries a yoke on its rearward end supporting an axle 37 for rotatably supporting the rear wheel 17, said frame member 22 extending through the vertical seat supporting frame member 25. A second longitudinally extending frame member 24 extends between and is secured to the sleeve 21 and frame member 25.

The rear wheel 17 includes a hub 26 in which is formed a conventional style of coaster brake, the hub 26 being fixedly secured to the wheel 17 and including a driven sprocket 27 which is mounted in the hub 26 for rotation in one direction with the wheel 17 for driving the bicycle and which is free to be held stationary while the rear wheel 17 is rolling in a forward direction. The conventional coaster brake assembly is enclosed within the hub 26 and not shown in details in the drawings, as such structure is conventional and has been in continued use for an extended length of time. A driving sprocket 28 is rotatably carried by the frame 18 between the front and rear wheels 16 and 17, and a chain 29 is engaged about the driving sprocket 28 and the rear driven sprocket 27. The driving sprocket 28 is adapted to be rotated by the crank arms 30 which are fixedly connected to the sprocket and rotated on the frame 18 by the pedals 31 which are rotatably mounted on the outer ends of the lever or crank arms 30.

The driving sprocket 28, the chain 29 and rear driven sprocket 27 constitute the conventional driving means 32 for the bicycle 15, and a second or high-speed drive 34 formed according to an embodiment of our invention is adapted to be operatively connected with the conventional driving means 32.

The added high-speed drive 34 is fixedly supported on the bicycle frame 18 by a pair of forwardly-extending supporting arms 35 and 36 which are fixed at their rear ends to the fixed rear axle 37 engaging through the center of the hub 26 and coaster brake engaged therein. A pair of flat plates 38 and 39 are fixed to or formed integrally with the forward ends of the respective arms 35 and 36 for supporting the driving engagement between the high-speed drive 34 and the conventional drive 32. A vertically-extending supporting arm 40 is fixedly connected to the upper end of the seat-supporting member 25 and is engaged at its lower end in a slot 41 in the upper end of the plate 39. The slot 41 extends substantially horizontally relative to the bicycle 15 and opens at the rear end. The bolt 42 which secures the lower end of the supporting bar 40 to the plate 39 engages through the lower end of the bar 40 and through the slot 41 for selectively positioning the lower end of the bar 40 along the length of the plate 39. A second supporting bar 44 is fixed on the other side of the bicycle 15 for supporting the other arm 35 in its fixed adjusted position. The supporting bar 44 is fixedly connected at its upper end to the seat-supporting frame member 25 and the lower end is slidably connected to the plate 38. The plate 38 is formed with a longitudinally-extending, horizontal slot 45 opening through the rear edge thereof, and the bolt 46, which secures the lower end of the supporting bar 44 to the plate 38, is slidably engaged in the slot 45. The engagement of the lower ends of the vertically-extending supporting bars 40 and 44 in the slots 41 and 45 provides for the vertical adjustment of the forward ends of the longitudinally-extending, high-speed gear-supporting members 35 and 36.

A supporting shaft 48 is fixedly secured between the plates 38 and 39, the opposite ends of the shaft 48 being slidably engaged in the downwardly-opening slots 49 and 50 in the side plates 39 and 38, respectively. The slots 49 and 50 are extended downwardly and rearwardly from the lower sides of the plates 38 and 39 and nuts or other suitable fastening means are engaged on the opposite ends of the shaft 48 for fixedly securing the shaft in an adjusted position between the supporting plates 38 and 39.

The sprocket 51 is rotatably mounted on the left end of the shaft 48 adjacent the left plate 38 between the plates 38 and 39. The idler sprocket 51 is engaged with the chain 29 to be rotated upon rotation of the main driving sprocket 28. A second sprocket 52 is rotatably mounted on the right end of the shaft 48 adjacent the side plate 39, the sprocket 52 having a diameter substantially greater than the idler sprocket 51. The high-speed driving sprocket 52 is operatively connected with the rear wheel 17 by the engagement of a chain 54 about the periphery of the sprocket 52 and a second driven sprocket 55 which is fixedly connected to the rear wheel 17.

The rear, high-speed, driven sprocket 55 is formed with a central opening, not shown in the drawings, for engaging the sprocket 55 about one end of the hub or coaster brake housing 26, and a pair of segmental arcuate clamping members 56 and 57 are adapted to be secured to the sprocket 55 for securing the sprocket to the rear wheel 17. The sprocket 55 is disposed on the outer side of the spokes 58 of the rear wheel 17 and the clamping members 56 and 57 are fixed on the inner side thereof, as clearly shown in Figures 7 and 8 of the drawings. Bolts 59 are engaged through the segmental plates 56 and 57 and between certain of the spokes 58 for engagement with the sprocket 55 for fixedly securing the sprocket 55 to the rear wheel.

A screw element 60 is fixed on the inner side of the idler sprocket 51 and is rotatably mounted on the left side of the supporting shaft 48. A shell or frame 61 open at the opposite ends thereof is fixed at one end to the high-speed driving sprocket 52 by bolts 62 engaging in a peripheral flange 64 on the right end of the shell or housing 61. The left end of the shell or hub 61 is rotatably engaged about the screw element 60 in spaced relation thereto and engages the inner side of the idler sprocket 51. A roller bearing 65 is engaged between the left end of the shell or hub 61 and the idler sprocket 51 and a second roller bearing 66 is engaged between the right end of the shell 61 and the mounting member 67 fixed on the shaft 48 at the right end thereof. A nut element 68 constitutes the clutch element which is adapted to be engaged with the shell 61 for driving the sprockets 51 and 52 together. The clutch element 68 is threadably engaged on the screw element 60 and is normally spring pressed toward the center of the shaft 48 by a light coiled spring 69 engaging about the left end of the shaft 48 and about the end of the screw element 60 adjacent the sprocket 51. An inwardly-extending shoulder 70 is fixed on the left end of the shell 61 extending inwardly about the left end of the screw element 60 for engagement with the clutch element 68 when the clutch element is pressed into frictional engagement therewith.

A collar member is supported on the right hand portion of the shaft 48 within the shell 61 for longitudinal and rotational movement with respect to the shaft 48, said collar member embodying a sleeve 1 which is slidably supported on the right hand portion of the shaft 48 within the shell 61 for both longitudinal and rotational movement and is formed with an outwardly-extending flange 72 at the left end thereof. The flange 72 is adapted to bear against the right end of the clutch element 68 for pressing the clutch element 68 into driving engagement with the inturned shoulder 70 of the housing or shell 61. A heavy spring 74 is engaged about the right end of the shaft 48 within the shell 61 and bears against the right end of the flange 72 for imparting to the flange 72 a resistance to rotation, thereby enabling the screw element 60 to rotate relative to the flange 72 and cause longitudinal movement of the clutch element 68 relative to the screw element.

When the flange 72 is moved longitudinally, the clutch element 68 threadably carried by the threaded element 60 is in frictional engagement with the shell 61 carried by the sprocket 52, whereby the sprocket 52 will be rotated by rotation of the idler sprocket 51. However, when the sprocket 52 is rotated at a speed greater than the speed of rotation of the idler sprocket 51, the frictional engagement of the clutch element 68 is broken as the friction will cause the clutch element to be threaded inwardly on the shaft 48 out of driving engagement with the shell 61 and high-speed driving sprocket 52.

The clutch element 68 is selectively engageable with the sprocket 52 and a lever 75 is pivotally mounted on the bicycle frame 16 for selectively engaging or disengaging the clutch element 68. The lever 75 includes a substantially longitudinally-extending bar 76 which is rotatably journaled at its forward end in a bearing 77 fixed on the forward end of the frame 18 and at its rearward end in a bearing 78 fixedly carried by the forward end of the supporting member 36 or plate 39. A lever arm 79 is fixed to or formed integrally with the forward end of the rotatable bar 76 and extends upwardly therefrom providing a handle to be actuated by the bicycle rider. The upper end of the lever arm 79 is adapted to be releasably engaged in a latch 80 fixedly carried by the longitudinally-extending frame member 22 immediately behind the handle-bar-supporting sleeve 21. The lever arm 79 is adapted to be seated in the notch 81 formed on the latch 80 for releasably securing the lever 79 in its clutch-disengaging position for normally operating the bicycle by the conventional driving means. A crank lever 82 is fixed on the rear end of the longitudinally-extending, rotatable bar 76 on the outer side of the plate 39 to be connected to the clutch element 68 within the shell 61. The shaft 48 is formed with a longitudinally-extending groove 84 opening through the right end thereof and opening at its inner end within the housing 61. A flexible element, as a cable 85 or the like, is adapted to be slidably engaged in the recess 84, the cable 85 being fixed at its outer end to the free end of the lever arm 82, and being fixed at its inner end to the slidable sleeve member 71. The inner end of the cable 85 is extended into a groove or notch in the right end of the sleeve element 71 and a set screw 86 threadably engaging in the sleeve 71 radially thereof engages the inner end of the cable 85 for clampingly securing the cable 85 to the clutch-member-actuating sleeve 71.

In the use and operation of the high-speed drive for the bicycle 15, with the lever 79 engaged in the notch 81, the clutch element 68 will be pressed out of engagement with the high-speed driving sprocket 52, whereby the bicycle 15 may be operated in a conventional manner. When the speed of the bicycle is desired to be considerably increased, the lever 79 may be moved out of engagement with the notch 81 to the right, or downwardly, as shown in Figure 10 of the drawings, and the flange 72 will then press the clutch element 68 into frictional engagement with the hub or shell 61, whereupon the rotation of the main driving sprocket 28 will effect the driving or rotation of the high-speed driving sprocket 52. The connection between the driving sprocket 52 and the high-speed driven sprocket 55 will effect the increased speed of the bicycle as actuated by the conventional driving sprocket 28. As the rear wheel 17 is connected to the driving sprocket 28 by way of the coaster brake engaging the sprocket 27 and chain 29, the excess rotation of the wheel 17 will in no manner affect the rotation of the driving sprocket 28 or its connection to the high-speed driving means. If during the rotation of the high-speed driving sprocket 52 the pedals 31 are held stationary for coasting, the rotation of the sprocket 52 directly connected by way of the chain 54 and sprocket 55 to the rear wheel 17 will be disengaged from the idler sprocket 51 and driving sprocket 28 as the rotation of the shell 61 will effect the inward rotation of the clutch element 60, thereby positioning the clutch element 68 inwardly of the flange 70 so that the bicycle will suitably coast in relation to the driving sprocket 28.

The high-speed driving means and connection between the high-speed driving means and the conventional driving means will in no manner affect the braking operation as accomplished by the conventional coaster brake assembly in the rear sprocket 26 when the crank arms 30 are rotated in a reverse direction. In other words, the bicycle 15 provided with the high-speed driving means described above may be actuated at a much higher speed than the conventional driving means will provide, and when the high-speed driving means are engaged with the conventional driving means, the normal braking and coasting provisions of the conventional driving means are in no way impaired, the structure and clutch connecton between the high and low-speed driving means providing for the coasting engagement of the high-speed driving means, the braking means provided by the conventional coaster brake assembly being conventionally operable upon reverse rotation of the pedal levers 30.

A dust cap or chain cover 90 is carried by the frame 18 and engages over the forward stretch of the chain 29 and forward edges of the sprockets 28 and 52 extending rearwardly over the forward upper end of the upper stretch while a second dust cover 91 is carried on the other side of the frame 18 over the front of the sprocket 52 and the forward end of the upper and lower stretches of the chain 54.

We do not mean to confine ourselves to the exact details of construction herein disclosed, but claim all variations falling within the purview of the appended claims.

We claim:

1. The combination with a bicycle including a frame, a rear axle supported in said frame adjacent one end thereof, a hub carrying a driven sprocket adjacent one end thereof and rotatably supported on said axle, a first driving sprocket wheel positioned forwardly of and spaced from said hub and rotatably supported in said frame, and a coaster brake positioned within and operatively connected to said hub, of a high speed drive operatively connected to said hub and said first driving sprocket wheel, said drive comprising a horizontally disposed shaft positioned above and spaced from said first driving sprocket wheel and fixedly carried by said frame, an idler sprocket wheel rotatably supported on said shaft adjacent to and spaced inwardly from one end thereof and drivingly connected with said first driving sprocket wheel, a second driving sprocket wheel rotatably supported on said shaft adjacent to and spaced inwardly from the other end thereof, an open ended hollow shell circumposed about the portion of said shaft intermediate said idler sprocket wheel and said second driving sprocket wheel and having one of its open ends fixedly secured to said second driving sprocket wheel for rotation therewith, an externally threaded screw element loosely supported on the portion of said shaft within said shell adjacent to said idler sprocket wheel and fixedly secured to the latter wheel, a clutch element positioned within said shell and rotatably mounted on said screw element for movement longitudinally into and out of frictional engagement with the interior wall of said shell adjacent to its other open end thereof, a collar member positioned within said shell adjacent said clutch element and slidably supported on said shaft, a second driven sprocket on said hub adjacent the other end thereof and drivingly connected with said second driving sprocket wheel, a first sprocket chain trained over and in meshing engagement with said first driving sprocket wheel, said idler sprocket wheel and said first named driven sprocket, a second sprocket chain trained over and in meshing engagement with said second driving sprocket wheel and said second driven sprocket, and hand actuable means positioned exteriorly of said shell and pivotally mounted on said frame and having one end engageable with said collar member for effecting the movement of said collar member into frictional engagement with said clutch element.

2. The combination with a bicycle including a frame, a rear axle supported in said frame adjacent one end thereof, a hub carrying a driven sprocket adjacent one end thereof and rotatably supported on said axle, a first driving sprocket wheel positioned forwardly of and spaced from said hub and rotatably supported in said frame, and a coaster brake positioned within and operatively connected to said hub, of a high speed drive operatively connected to said hub and said first driving sprocket wheel, said drive comprising a horizontally disposed shaft positioned above and spaced from said first driving sprocket wheel and fixedly carried by said frame, an idler sprocket wheel rotatably supported on said shaft adjacent to and spaced inwardly from one end thereof and drivingly connected with said first driving sprocket wheel, a second driving sprocket wheel rotatably supported on said shaft adjacent to and spaced inwardly from the other end thereof, an open ended hollow shell circumposed about the portion of said shaft intermediate said idler sprocket wheel and said second driving sprocket wheel and having one of its open ends fixedly secured to said second driving sprocket wheel for rotation therewith, an externally threaded screw element loosely supported on the portion of said shaft within said shell adjacent to said idler sprocket wheel and fixedly secured to the latter wheel, a clutch element positioned within said shell and rotatably mounted on said screw element for movement longitudinally into and out of frictional engagement with the interior wall of said shell adjacent to its other open end thereof, a collar member positioned within said shell adjacent said clutch element and slidably supported on said shaft, a second driven sprocket on said hub adjacent the other end thereof and drivingly connected with said second driving sprocket wheel, a first sprocket chain trained over and in meshing engagement with said first driving sprocket wheel, said idler sprocket wheel and said first named driven sprocket, a second sprocket chain trained over and in meshing engagement with said second driving sprocket wheel and said second driven sprocket, hand actuable means positioned exteriorly of said shell and pivotally mounted on said frame and having one end engageable with said collar member for effecting the movement of said collar member into frictional engagement with said clutch element, and a spring circumposed about said shaft and operatively connected to said collar member for imparting a resistance to the rotative movement of said collar member.

IVO J. RIGA.
JAMES P. RIGA.

REFERENCES CITED

The following references are of record in the file of this patent:

UNITED STATES PATENTS

| Number | Name | Date |
|---|---|---|
| 476,157 | Moore et al. | May 31, 1892 |
| 501,874 | Cunningham | July 18, 1893 |
| 803,250 | Smith | Oct. 31, 1905 |
| 1,264,231 | Wagner | Apr. 30, 1918 |